United States Patent [19]

Massoudi

[11] Patent Number: 4,984,287
[45] Date of Patent: Jan. 8, 1991

[54] METHOD FOR ORIENTING A DUAL MOUSE OPTICAL SCANNER

[75] Inventor: Firooz Massoudi, Sunnyvale, Calif.

[73] Assignee: MSC Technologies, Inc., Fremont, Calif.

[21] Appl. No.: 271,452

[22] Filed: Nov. 15, 1988

[51] Int. Cl.$^5$ ............................................. G06K 9/00
[52] U.S. Cl. ......................................... 382/59; 382/7; 382/46; 340/710; 358/473
[58] Field of Search ................ 382/7, 46, 59; 340/710

[56] References Cited

U.S. PATENT DOCUMENTS

| | | | |
|---|---|---|---|
| 3,297,879 | 1/1967 | Mayer | 250/237 |
| 3,825,746 | 7/1974 | Kendler et al. | 250/209 |
| 3,957,378 | 5/1976 | Zipin | 356/169 |
| 4,022,969 | 5/1977 | McKinlay et al. | 178/18 |
| 4,074,131 | 2/1978 | Schwebel | 250/237 |
| 4,176,276 | 11/1979 | Kaul et al. | 250/237 |
| 4,179,685 | 12/1979 | O'Maley | 340/146.3 |
| 4,303,914 | 12/1981 | Page | 340/706 |
| 4,306,147 | 12/1981 | Fukuyama et al. | 250/221 |
| 4,364,035 | 12/1982 | Kirsch | 340/710 |
| 4,384,204 | 5/1983 | Tamaki et al. | 250/237 |
| 4,390,873 | 6/1983 | Kirsch | 340/710 |
| 4,409,479 | 10/1983 | Sprague et al. | 250/237 |
| 4,465,373 | 8/1984 | Tamaki et al. | 356/374 |
| 4,546,347 | 10/1985 | Kirsch | 340/710 |
| 4,581,761 | 4/1986 | Ichinokawa et al. | 382/13 |
| 4,751,380 | 6/1988 | Victor et al. | 250/221 |
| 4,797,544 | 1/1989 | Montgomery et al. | 250/221 |

*Primary Examiner*—Leo H. Boudreau
*Assistant Examiner*—Dan Santos
*Attorney, Agent, or Firm*—Thomas Schneck

[57] ABSTRACT

A method for orienting a dual mouse optical scanner on an orthogonal grid pattern comprising the steps of (a) placing a dual mouse scanner on a grid pattern at a small angle to the vertical lines of the grid pattern and commencing motion detection with the two mice, (b) setting the coordinate position of each mouse at (0,0), (c) rotating the scanner in a predetermined manner while measuring the vertical distance on the grid pattern between the two mice for each new position of the scanner, (d) determining an average scanner position amongst all scanner positions having the same maximum vertical grid distance between the mice, and (e) establishing the coordinate position of one mouse at the average scanner position as the origin of a coordinate system in the memory of a computer in communication with the scanner and the vertical line closest to the origin and the coordinate position of the other mouse as the vertical axis of the coordinate system.

17 Claims, 8 Drawing Sheets

METHOD FOR ORIENTING A DUAL MOUSE OPTICAL SCANNER

BACKGROUND OF THE INVENTION

1. Field of the Invention

The present invention relates generally to a method for detecting the relative orientation of a scanner on a grid pattern, and more particularly to a method for establishing a coordinate system in the memory of a computer which corresponds to the grid pattern through communication with a scanner comprised of two position sensors and a detector array.

2. Brief Description of the Prior Art

Position sensors or cursor control devices which determine the relative position of a point on a grid and thereby determine the movement of a cursor on a visual display system, such as a computer screen, are known in the art. One such device is an electro-optical or electro-mechanical position sensor, commonly called a mouse. As used herein, the term "mouse," or its plural "mice," is used to describe any type of mechanical or optical device capable of detecting its relative motion and/or position over a surface and producing an output signal that can be used to determine the position of a cursor on a computer screen or an address in a computer's memory.

In the typical application, a single electro-optical or electro-mechanical mouse is used in combination with a computer terminal and a software program which allows the operator to enter instructions for a computer without need of a keyboard. Some prior art devices have combined a single mouse with a detector array, capable of detecting pixel data from a scanned surface to produce a type of scanning device. These types of scanning devices have typically been used to scan a single line of text at a time or other indicia located at some position on the scanned page. However, the usefulness of such scanners is limited because the mouse used in the scanner can only detect motion in one dimension and cannot relate its position on the scanned page to a cursor position.

Another type of prior art scanner, such as the "SkyS-CAN" Model SCN-101 Scanner by Skyworld Technology, Ltd. of Hong Kong, has been utilized to scan a three-to-four inch wide path of information from a scanned page. However, such scanners are limited because they are also constrained to detecting motion in only one dimension, and the recreated images produced by such scanner cannot be combined to form single screens of information, thereby making it impossible to reproduce a standard page of text.

A scanner utilizing two of the above described mice with a detector array is shown in U.S. application Ser. No. 889,130, filed July 23, 1986, which discloses an optical scanner for copying characters on a page and transferring them to the display screen or memory of a computer. Between the scanner and the page is a transparency containing indicia of position, or a grid pattern. The scanner is equipped with an array of photo-sensitive elements for detecting light reflected from the printed characters on the page, but not the transparency. In contrast, the scanner is equipped with two optical mice, which are sensitive to light reflected from the transparency and not the page, for determining the position and relative angle of the detector array with respect to the grid pattern.

Each mouse operates as a counter, detecting the number of vertical or horizontal lines crossed on the grid pattern, to determine the position of each mouse with respect to the grid pattern. Even though the mice may be able to count the number of lines crossed, it is not possible to determine the position of a mouse until a starting point from which to count has been determined and the lines which are being crossed have been designated as vertical or horizontal lines. Thus, mice are typically unable to determine their position with respect to the grid pattern unless they are first oriented (the process of determining the horizontal and vertical axis of a coordinate system which will correspond to the memory addresses of the computer) and initialized (the process of establishing a starting point from which to start counting lines).

A second type of dual mouse scanner is described in Ichinokawa et al, U.S. Pat. No. 4,581,761, issued Apr. 8, 1986, which shows an image scanner which is randomly movable over the surface of a sheet of paper, which is in turn laying over a pad having magnetostrictive properties. The pad is operative to be subjected to pulses introduced at two adjacent ends of the pad (one end representing the vertical axis and the other end representing the horizontal axis) which cause the magnetostrictive material of the pad to produce wave like disturbances in the surface of the pad which travel in vertical and horizontal directions. The position sensors have the ability to detect the raised portion of the pad when a wave passes thereunder and the ability to determine the position of each sensor with respect to the pad by extrapolating the amount of time required for a wave to reach a position sensor from its starting point. Mice capable of determining their own position with respect to the grid or pad do not need to be oriented or initialized.

LIST OF OBJECTIVES

It is therefore a primary objective of the present invention to provide a method for determining the orientation of a dual mouse scanner on a grid pattern and communicating that orientation to the memory of a computer in communication with the scanner.

Another objective of the present invention is to provide a method for orienting a dual mouse scanner on a grid pattern whereby the scanner may be used for free-form scanning.

Another objective of the present invention is to provide a method for determining the orientation of a dual mouse scanner on a grid pattern which may be quickly accomplished at almost any point on the grid pattern.

These and other objects and advantages of the present invention will no doubt become apparent to those skilled in the art after having read the following detailed description of the preferred embodiment which are contained in and illustrated by the various drawing figures.

SUMMARY OF THE PRESENT INVENTION

Briefly, a preferred embodiment of the present invention comprises the steps of (a) placing a dual mouse scanner on a grid pattern at a small angle to the vertical lines of the grid pattern and commencing motion detection with the two mice, (b) setting the coordinate position of each mouse at (0,0), (c) rotating the scanner in a predetermined manner while measuring the vertical distance on the grid pattern between the two mice for each new position of the scanner, (d) determining an average scanner position amongst all scanner positions having the same maximum vertical grid distance between the mice, and (e) establishing the coordinate position of one mouse at the average scanner position as the origin of a coordinate system in the memory of a computer in communication with the scanner and the vertical line closest to the origin and the coordinate position of the other mouse as the vertical axis of the coordinate system.

DESCRIPTION OF THE PREFERRED EMBODIMENT

Figure 1:
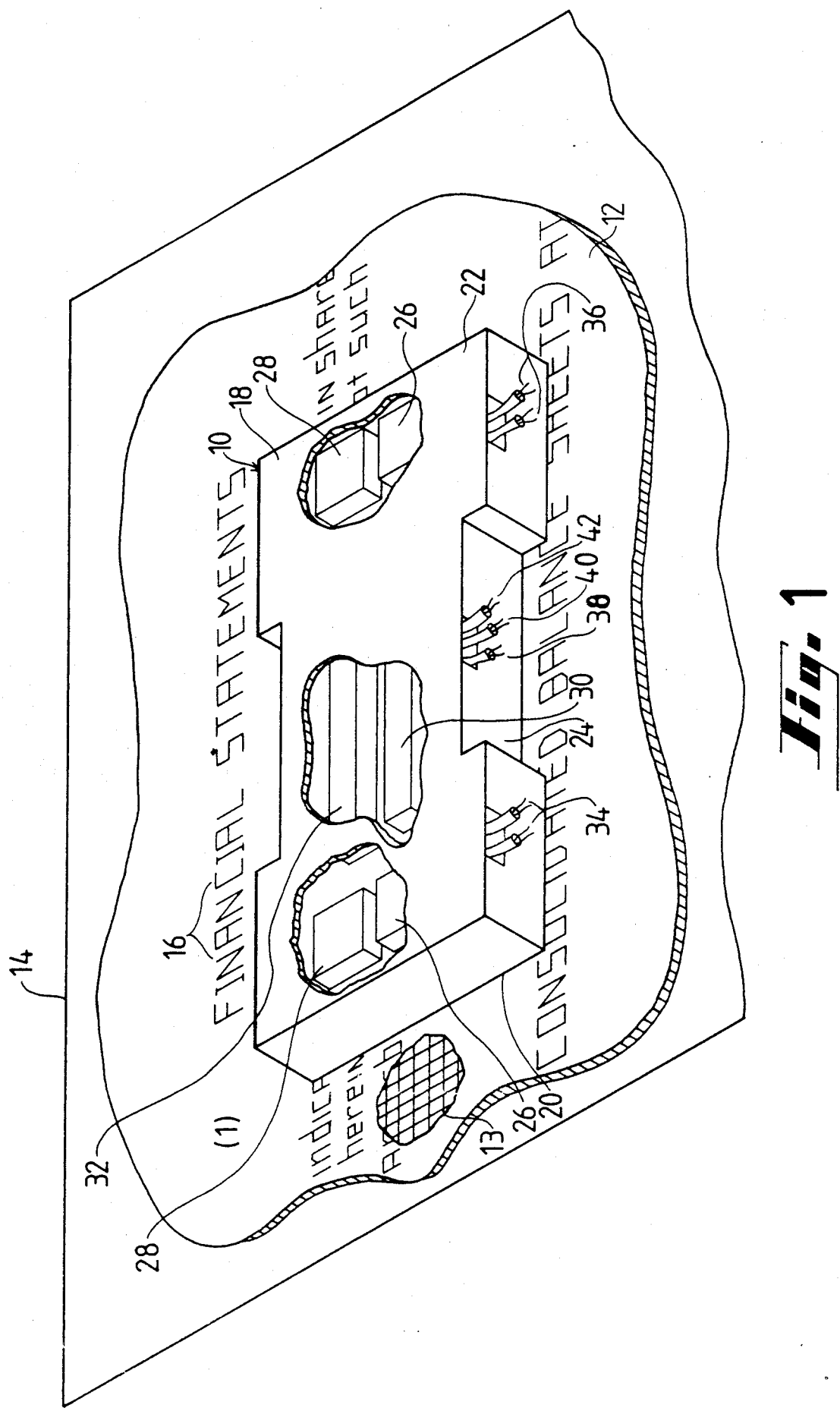
FIG. 1 is a perspective plan view of a scanner having a detector array and two position sensors placed over a visually transparent grid pattern in accordance with the preferred embodiment of the present invention.

FIG. 1 is a perspective plan view of a scanner having a detector array and two position sensors in accordance with the preferred embodiment of the present invention. The scanner 10 is shown placed upon a transparency 12 having a grid pattern 13 thereon, which is in turn placed over a sheet of paper 14 from which printed information 16, or pixel data, is to be scanned. Scanner 10 is comprised of a housing 18, containing two position sensor sections 20 and 22 and a scanning array section 24.

Each position sensor 20 contains a light source 26 and a detector 28. The scanning array section 24 contains a light source array 30 and a detector array 32. Two sets of wires 34 and 36, which communicate detected motion information to a computer (not shown), pass from position sensor sections 20 and 22 respectively. Likewise, data lines 38, timing line 40, and end of signal line 42 communicate information from light source array 30 and detector array 32 to various components of the computer (not shown, but described below).

The housing 18 should fit into the palm of the hand of the operator and be smoothly moveable over the surface of the transparency 12. The light sources 26 and 30 may be light emitting diodes, incandescent bulbs or other broadband illumination sources, and may emit ultraviolet and infrared light, as well as visible light. Alternatively, the light sources 26 and 30 may be lasers, such as a diode laser. The detectors 28 and 32 can be comprised of any of a number of light sensitive devices, such as photodetectors or CCD's. Generally, the light sources and detectors should be arranged so as to illuminate a portion of the grid pattern 13 or page 14 and reflect that light onto one of the detectors in sufficient magnification so as to reduce optical errors.

The transparency 12 can be made from any of a number of materials, such as mylar or plastic, and have the grid pattern 13 printed, dyed or formed on one of its surfaces. The lines forming the grid pattern 13 are preferably comprised of a material which is transparent to visible light, but not transparent to ultraviolet or infrared light. Thus, if the light source array 30 transmits only visible light and the detector array 32 only detects visible light, but light source 26 only transmits nonvisible light and the detector 28 only detects nonvisible light, then the mice will only detect information regarding the position of the scanner and the detector array will only detect pixel data from the page being scanned.

Figure 2:
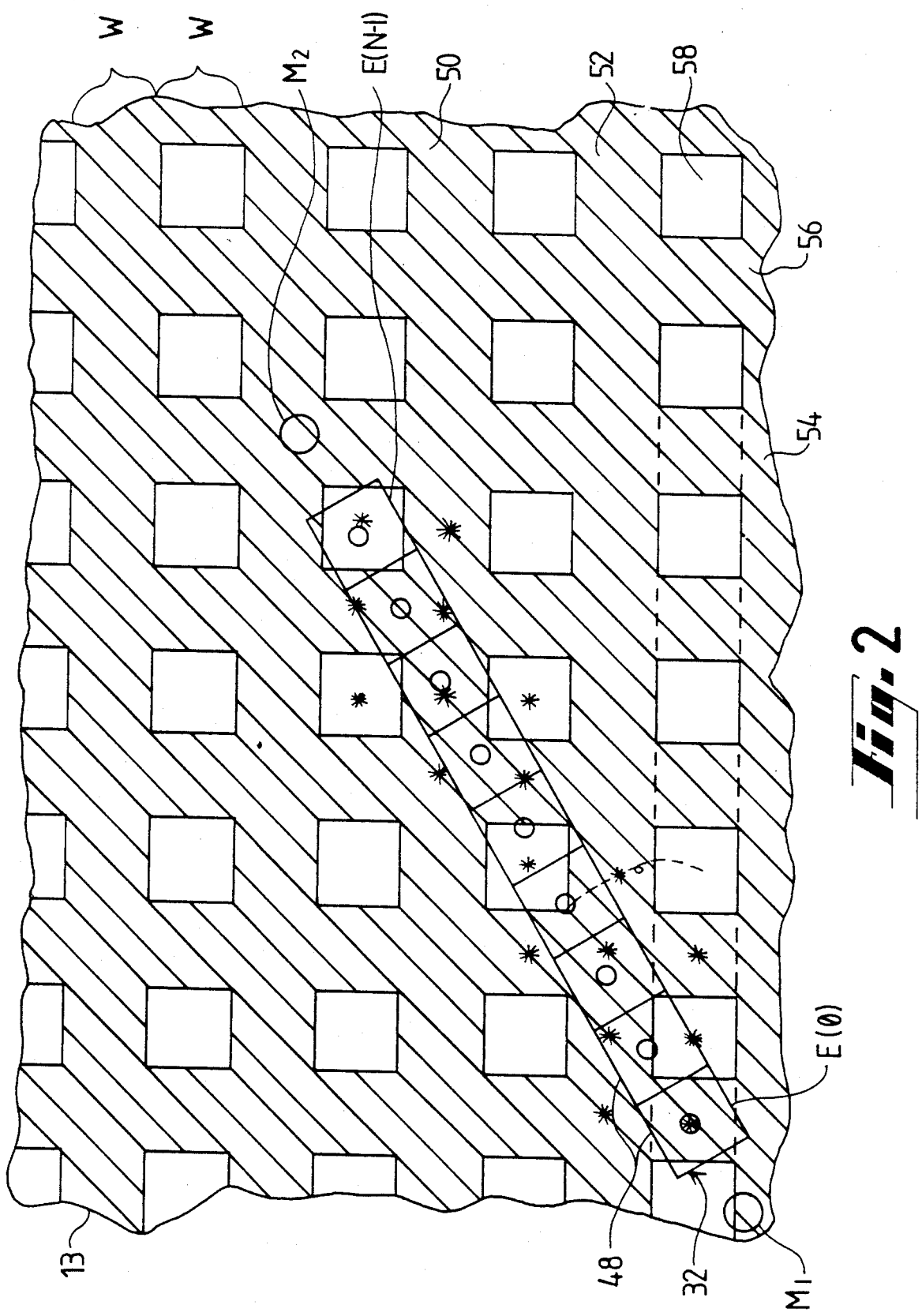
FIG. 2 is a plan view graphically illustrating the relationship between the scanner and the grid pattern of FIG. 1.

FIG. 2 illustrates the relative size of the elements 48 of the detector array 32 with respect to the electronic representation of the grid pattern 13. Two mouse points, $M_1$ and $M_2$, which represent relative position indicators for the mice of the scanner, are shown in their approximate positions with respect to the detector array 32. The electronic grid pattern 13 is made up of two intersecting orthogonal sets of grid lines, including horizontal lines 50 and 52 and vertical grid lines 54 and 56, with spaces 58 defined therebetween.

Electronic grid pattern 13 is referred to as being "electronic" because FIG. 2 only depicts the magnified image of the grid pattern and data in relation to the detector elements 48, rather than the actual physical size of the grid pattern and underlying data. Each set of grid lines is made up of parallel uniformly spaced grid lines, forming uniformly sized spaces of approximately equal line width therebetween. Thus, the grid lines 50–56, and the spaces 58, have approximately the same line width, W. A pixel is defined by any area within a space or grid line having sides of W, such as a space or square portion of a line. Typically, there are 200 grid lines per inch of grid pattern, thus one square inch of grid pattern will be 400 pixels long by 400 pixels wide. The actual physical size of grid pattern 13 is approximately one-fourth the size depicted in FIG. 2, but the magnification effect could be greater or smaller depending on the size of detector elements and grid pattern utilized. Likewise, other line widths may be used and the grid pattern need not form square spaces, although square spaces may be more easily manipulated by the computer.

The elements 48 of the detector array 32 are approximately the size of a pixel of the grid pattern. There are about 400 detector elements per inch of detector array 32, which is typically two to three inches in length. There would typically be as many as 1024 detector elements 48 in the typical detector array 32, although only nine such detector elements, labeled $E(0)$ through $E(N-1)$ are shown in FIG. 2 and not necessarily all detector elements are utilized by the scanner. The detector array 32 can be moved in any direction relative to the grid pattern 16 and the X-Y coordinate axes.

Each detector element $E(0)$ through $E(N-1)$ has its center marked with a "o." A number of neighboring pixels are marked with a "*." In FIG. 2, no X-Y coordinate system is shown because when the scanner 10 is first placed on the grid pattern 13, the position detectors M1 and M2 can only detect the direction and amount of movement of the scanner, not its relative position on the grid pattern. When the scanner has been oriented to the grid pattern as will be described below, coordinate system axes can be established for the grid pattern 13.

Figure 3:
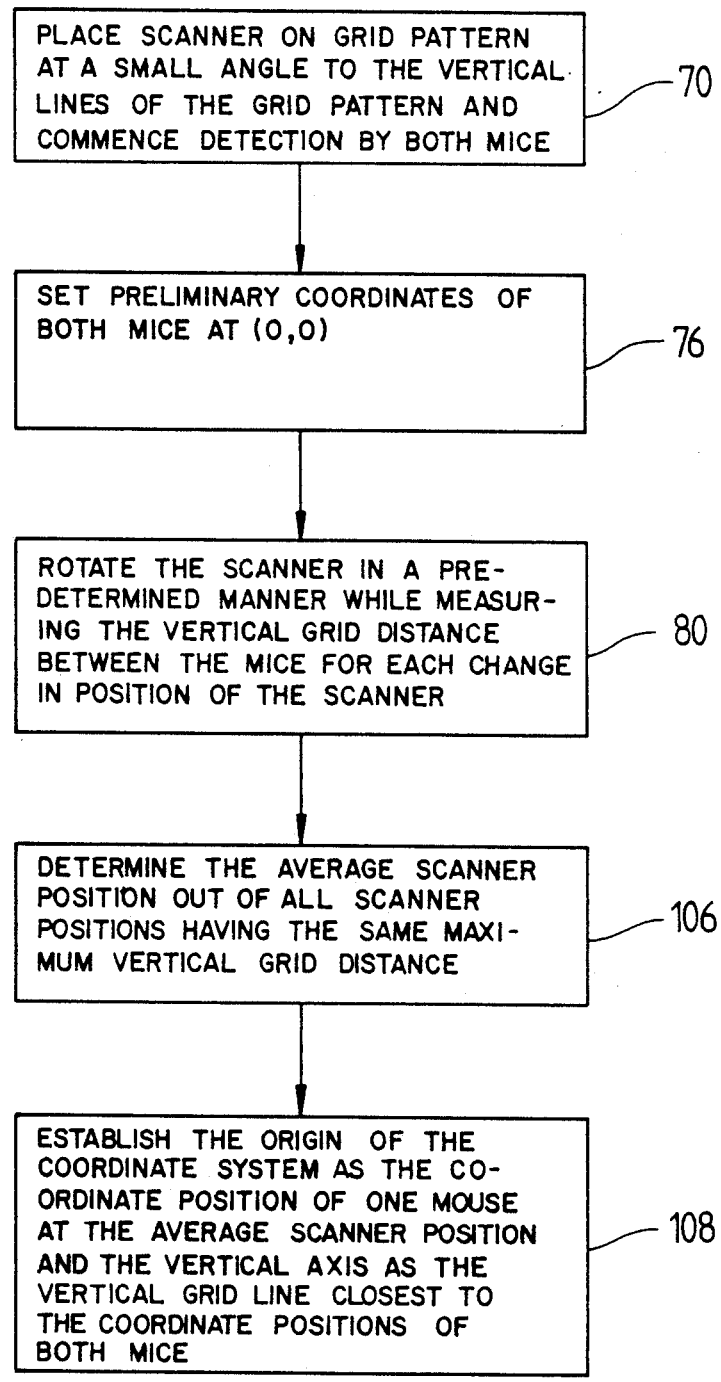
FIG. 3 is a flow diagram depicting the orientation process in accordance with the preferred embodiment of the present invention.

FIG. 3 is a flow diagram depicting the process of determining the orientation of the scanner with respect to the grid pattern. In the step 70, the scanner is placed on the transparency containing the grid pattern and covering the indicia to be scanned. Although, it would be possible to place the scanner at any position on the grid pattern, it is preferred that the scanner be placed at a small angle to the vertical axis, and in particular to a selected vertical line. As will be further explained below, the slight displacement of the two mice does not detract from the necessity to set the vertical coordinates of both mice at zero, thereby simplifying the number of calculations required to determine the orientation of the scanner. Likewise, the scanner need not be aligned at a slight angle to the vertical axis and may just as easily be aligned at a slight angle to the horizontal axis. There is no specific angle at which the scanner need be aligned with the vertical axis because the pixels and grid lines are so small in comparison to the visual image being scanned that any misalignment of the image would hardly be noticeable and any misalignment that did occur would be uniform for the entire scanned image.

Once the scanner has been placed on the grid pattern and generally aligned with one axis, the mice may be turned on to start detecting any motion of the scanner. The mice may be turned on with either a signal issued from the computer instructing the mice to commence detection or a signal generated by a manual switch on the scanner.

At this point, the actual position of either mouse point M1 or M2 on the grid pattern is still unknown. Thus, even though the mice have been turned on, the computer with which they are in communication will not treat them as being ready until the mice have been given specific points on the grid pattern from which to start counting. By assigning temporary coordinates to both mouse points, starting points from which both mice may begin detecting motion can be established. In the step 76, both mouse point M1 and mouse point M2 are assigned the temporary coordinates of (0,0). There is no need to initially offset the coordinate position of one mouse from that of the other by the physical distance between the two mice because the change in position of the mice would always be the same despite any offset constant. It should also be noted, that by only using values of DX and DY to determine the orientation of the scanner, all problems associated with attempting to analyze rotational or translation motion are eliminated.

In the step 80, the operator begins to rotate the scanner in one direction toward the selected axis of alignment, the vertical axis. As the scanner is rotated toward the vertical axis, the mice communicate motion signals to the computer. The computer analyzes the motion signals and uses them to calculate the distance DY, the grid distance between the two mice, each time one mouse crosses a line on the grid pattern. Thus, DY is calculated for each detectable change in position of the scanner. For each change in position of the scanner, the coordinate positions of the mice and the calculated value of DY is stored in the memory of the computer. The slight angle of displacement at which the scanner is originally aligned when placed on the grid pattern, should be large enough so that a change in the vertical coordinates of the mice will be detected during the orientation procedure.

The computer then begins to compare the various values of DY together to determine which value of DY is largest. When the scanner was aligned at a small angle to the vertical axis, the distance between the mice with respect to either axis was zero because both mouse points were assigned the same temporary coordinates. As the two mice are moved with respect to one another these values change, and as the scanner approaches parallel alignment with the selected vertical axis, the difference between the vertical coordinates of the mice increases. Thus, if the computer is able to determine that a certain value of DY is greater than all other values of DY, the computer can then assume that the coordinates for the mice at the position of the scanner where maximum DY was determined are the coordinates of a vertical line.

To accomplish the task of determining the maximum value of DY, each new value of DY that is larger than a previous value of DY is assumed to be the largest possible value of DY until it is replaced by a subsequently discovered larger value. When the value of DY starts decreasing instead of increasing, the computer signals one of its lights or speakers or sends a signal to one of the mice thereby activating a light or speaker (not shown) to indicate that the maximum possible value for DY has been found. Once the computer signals that maximum DY has been found, the operator may begin using the scanner to scan data, while the computer continues to establish the origin of the coordinate system as set forth below.

It should be noted that if the alignment of the scanner when the operator begins rotating it toward the vertical line is at too small of an angle to the selected vertical line, such that the value of maximum DY immediately begins decreasing, it may be necessary for the operator to rotate the scanner back to a position which is at a larger angle to the selected vertical line and start again. Since the scanner may not be properly aligned at first or the operator may not rotate the scanner in a sufficient arc from the starting position, it is believed that twisting the scanner back and forth across the selected vertical line will help assure that the value calculated for DY accurately portrays the maximum value of DY for the grid pattern and the scanner, although it should be possible to only rotate the scanner once to establish maximum DY.

If the mice had infinite resolution, only one position of the scanner would be determined to be the point of maximum DY, but given that the resolution of the mice is finite and that all motion is reported in integers, some error will be introduced, resulting in a number of different positions all sharing the point of maximum DY. To account for this error, it is necessary to determine an average position amongst all of the positions sharing the point of maximum DY.

Even though the computer has indicated that a value of maximum DY has been detected, it will still be necessary to average all of the scanner positions having the value of maximum DY to determine a single set of coordinates representing the vertical axis. The process of determining the average position of the scanner can be better understood with reference to FIG. 4, which illustrates the path 107 that might be followed by one mouse across the surface of the grid pattern 13.

Figure 4:
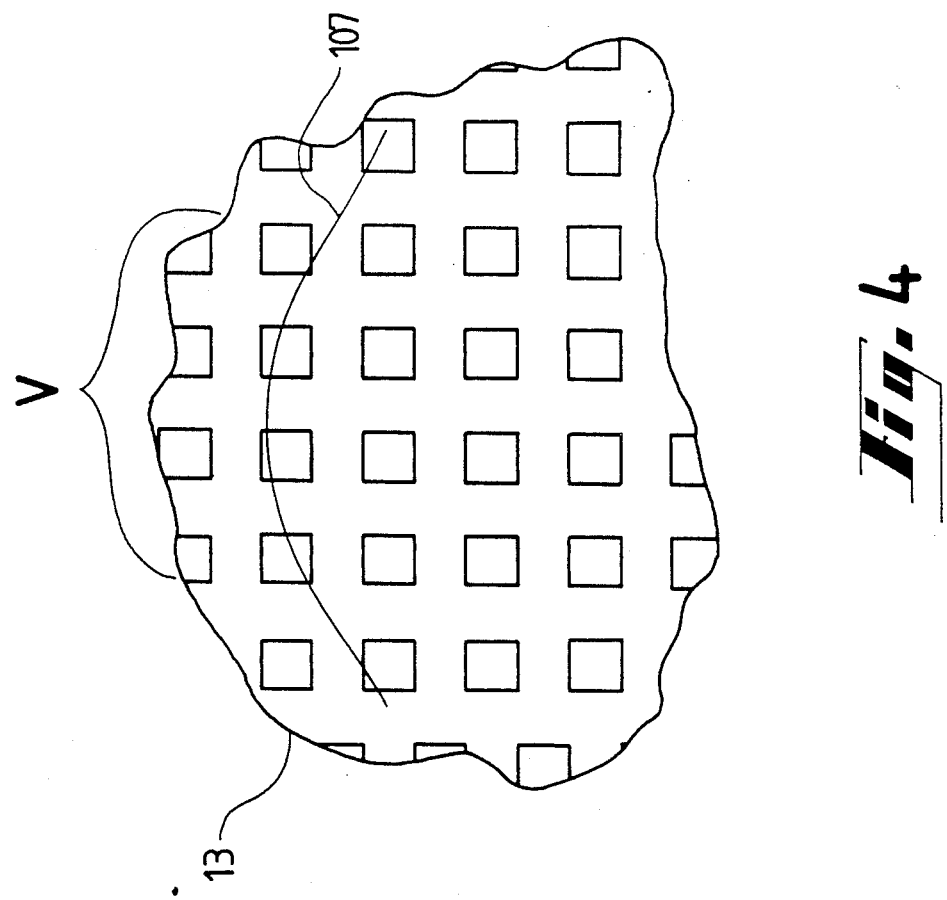
FIG. 4 is a plan view graphically illustrating the path followed by one mouse of the scanner across the surface of the grid pattern in accordance with the preferred embodiment of the present invention.

As can be seen in FIG. 4, the portion of the path bordered by the area V corresponds to mouse positions which have the same coordinate value for one of its coordinates, despite the change in position of the mouse. Thus, if the scanner was at maximum DY when the mouse was in the area V, all of the positions of the scanner when the mouse was in the area V may be considered to have the value of maximum DY. Since, there can only be one vertical and horizontal axis, however, it is necessary to select only one of the lines as the one most likely to be the actual axis, which is done by selecting the average position amongst all of the positions of the scanner within the area V.

Referring back now to FIG. 3, it can be seen that once the average scanner position of maximum DY has been determined, either of the mouse points may be used to establish the origin of the coordinate system. In the step 108, the temporary coordinate positions and axes established above are converted to actual X-Y coordinates and communicated to the computer to establish the orientation of the memory addresses so that scanned pixel data can be stored in appropriate corresponding locations. Thereafter, the operator can relocate the origin of the coordinate system to any point on the grid pattern. The origin can be moved by signalling the computer that it is to be moved, such as by toggling a switch, then moving the scanner across the surface of the grid pattern to the desired location and signalling the computer again when the desired location has been reached.

Figure 5:
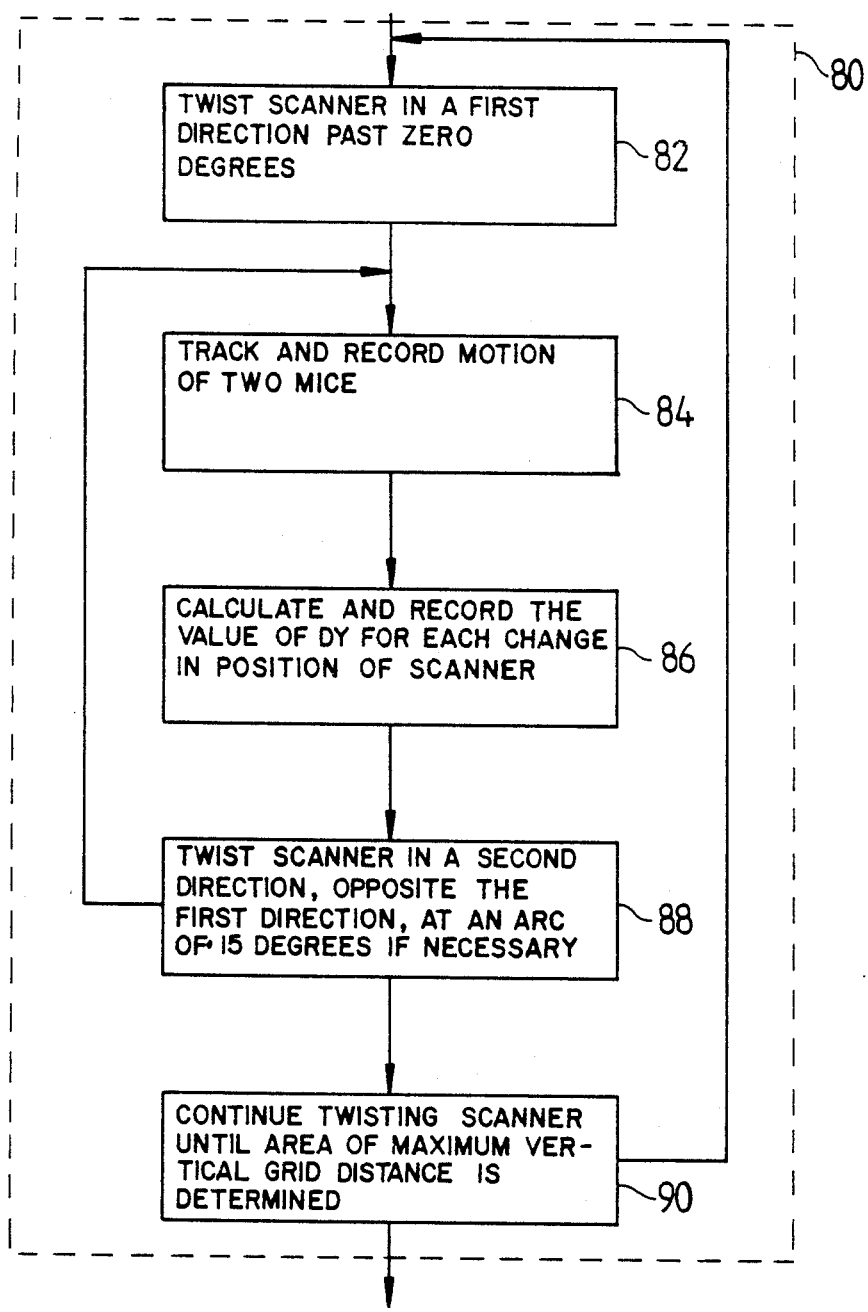
FIG. 5 is a flow diagram illustrating the process of rotating the scanner while measuring the maximum vertical grid distance between the two mice.

FIG. 5 illustrates the process of twisting the scanner while measuring the values of DY to determine the maximum value of DY, as illustrated in step 80 of FIG. 3. In step 82, the scanner is twisted in a first direction past the selected vertical line, or past zero degrees of that line. It is preferred that the scanner be twisted at least 30 degrees in the first direction to assure that the value of DY will decrease at some point during the twisting action. During the twisting of the scanner, the position of each mouse is tracked and recorded by the computer, as shown in step 84. Likewise, in step 86, the value of DY is calculated and recorded for each change in position of the scanner on the grid pattern 13.

Although, the single rotation in the first direction may have been sufficient for the computer to accurately determine maximum DY, rotating, or twisting, the scanner in a second opposite direction will assure that maximum DY is determined as soon as possible with some reliability. Steps 84 and 86 are repeated for every change in position of the scanner. The scanner is continually twisted in the first and second directions as described above until the computer has determined the area of maximum DY, as indicated in the step 90, and has so indicated that determination to the operator.

Figure 6:
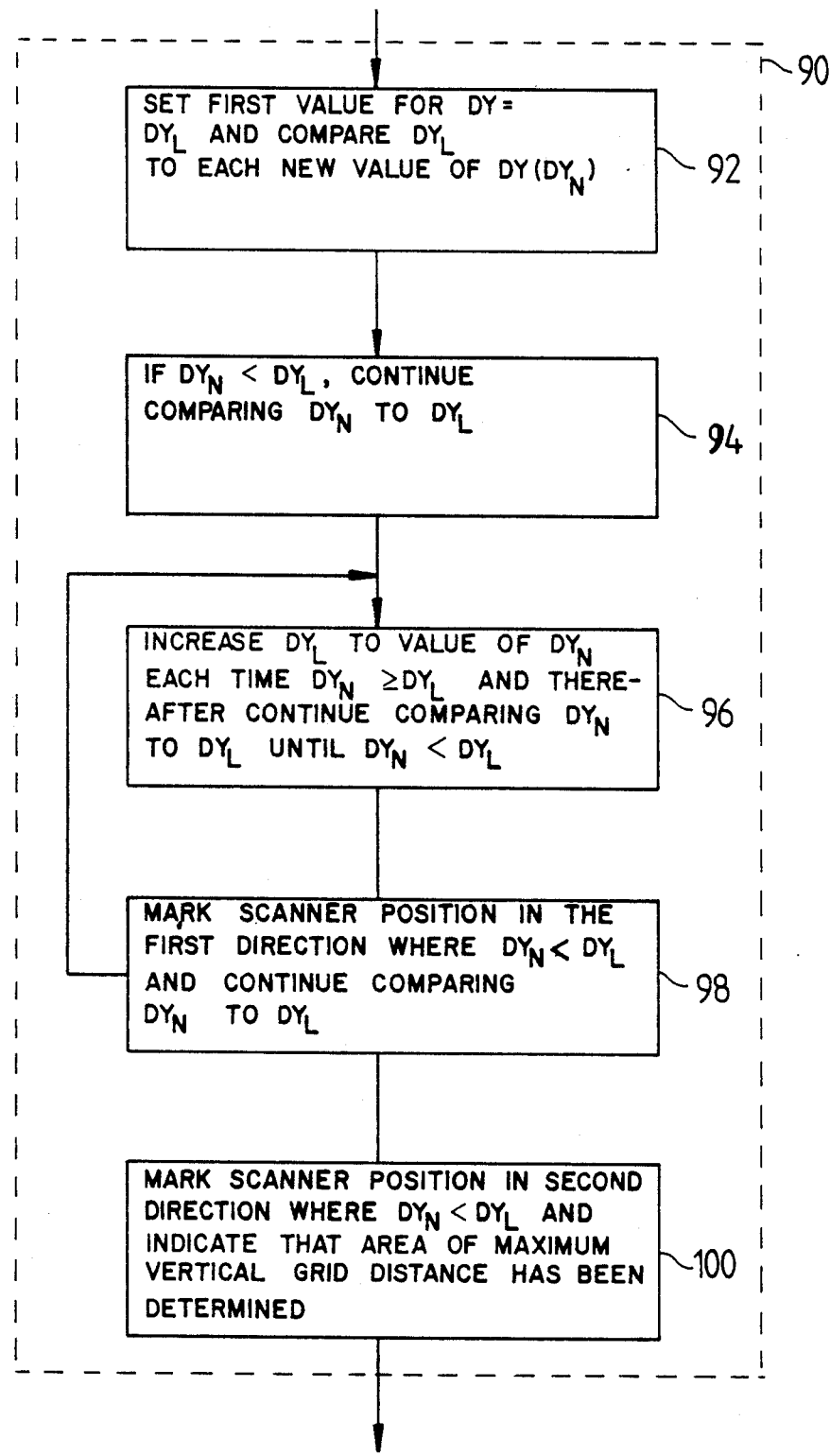
FIG. 6 is a flow diagram further depicting the process of determining the area of maximum vertical grid distance on the grid pattern in accordance with the preferred embodiment of the present invention.

The process of determining the area of maximum DY on the grid pattern in step 90 is further illustrated by the flow diagram of FIG. 6. In the step 92, the first value calculated for DY is assumed by the computer to be the largest value of DY ($DY_L$). To determine whether or not the value assumed to be maximum DY is actually maximum DY, each new value calculated for DY ($DY_N$) will be compared to $DY_L$. If the value of $DY_N$ is determined to be smaller than the value of $DY_L$, as determined in step 94, the computer will automatically continue to compare each new value of DY against the largest value of DY because the current value determined for $DY_L$ may not be the largest possible value of DY.

When $DY_N$ is finally determined to be larger than or equal to $DY_L$, the value of $DY_L$ is replaced by the new larger value of $DY_N$ to create a new value for $DY_L$. Each value of $DY_N$ thereafter is compared to this new value of $DY_L$ and replaced by the value of $DY_N$ each time $DY_N$ is larger than or equal to $DY_L$. This is repeated until a value of $DY_N$ is determined to be less than the value of $DY_L$, which would indicate that the scanner is moving further away from the selected vertical line. As indicated in step 98, when $DY_N$ is determined to be less than $DY_L$ after $DY_L$ has been replaced by at least one value of $DY_N$, the position of the scanner at such a position is marked as one boundary of the area of maximum DY. To determine the other boundary of maximum DY, the values of $DY_N$ and $DY_L$ are continued to be compared and the direction of rotation is varied until a position in the opposite direction is determined to be the other boundary of the area of maximum DY. If different scanner positions in the same direction of rotation are determined to both indicate the boundary of the area of maximum DY, the position further away from the selected vertical line is selected to indicate the boundary of the area and the other position is ignored.

Alternatively, the process illustrated in FIG. 3 may be accomplished by simultaneously calculating the horizontal grid distance, DX, between the mice for each position of the scanner and comparing DX to DY to determine where the vertical or horizontal axis is located. At maximum DY, the value of DX should be minimum, or equal to zero. Thus, the process of determining average maximum DY would remain the same, but the added step of comparing the maximum values of DY to the calculated value of DX would be utilized to assure that maximum DY is truly maximum DY. This may particularly be helpful where two positions are determined to be the average maximum value of DY, yet only one scanner position having the value $DY_L$ coincides with minimum DX.

Figure 7:
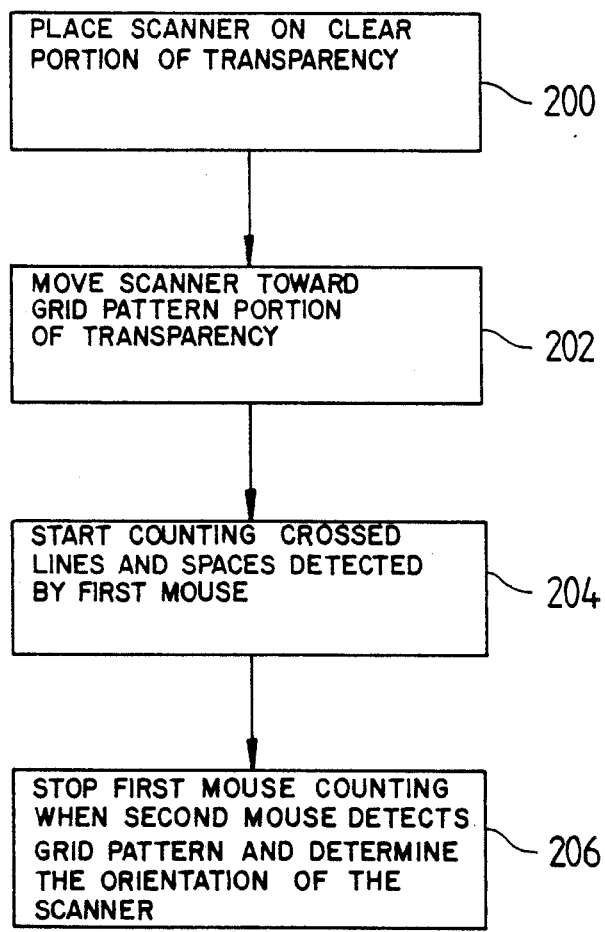
FIG. 7 is a flow diagram depicting an alternative embodiment of the present invention.

Alternatively, a second method of determining the relative orientation of a dual mouse optical scanner or a grid pattern can be illustrated with reference to FIG. 7. In step 200, the scanner is initially placed upon the transparency 12, but over an area of the transparency, such as a side, where there is no grid pattern 13. Hence, neither mouse is capable of detecting my motion information until the scanner is moved over the area of the transparency containing the grid pattern 13, which is generally the entire area covering the printed information to be scanned.

To orient the scanner to the grid pattern, the scanner is moved toward the grid pattern 13 pattern portion of the transparency as shown in the step 202. Since it is unlikely that the mice would be aligned parallel to either the horizontal or vertical lines, the computer assumes that the mice will not reach the first vertical or horizontal line at the same time. However, even if the computer was to assume incorrectly, this problem can be easily corrected, as will be explained below. In the step 204, the first mouse to cross a horizontal or vertical line (from herein a vertical line) starts counting the number of lines or spaces that it crosses. This mouse continues to count until the second mouse crosses the vertical line, at which point the scanner is oriented to the grid pattern, as is shown by the step 206.

Figure 8:
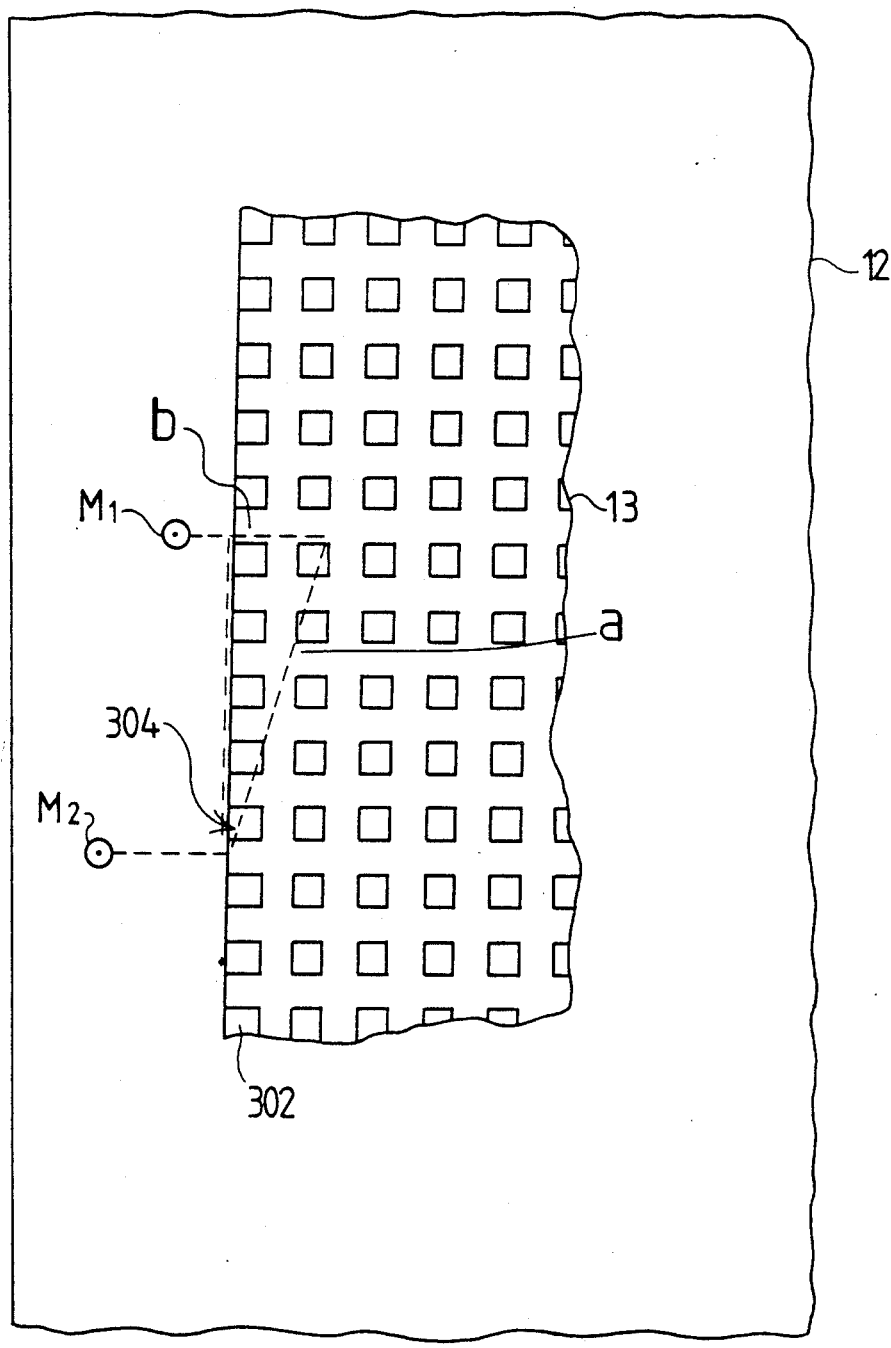
FIG. 8 is a plan view graphically illustrating the path followed by both mice of the scanner across the surface of the transparency in accordance with the alternative embodiment of the present invention.

The process of determining the orientation of the scanner from the motion information obtained from the mice up until the second mouse crossed the vertical line can be better understood with reference to FIG. 8. It must be noted that the actual physical distance from one mouse to the other is a constant value which may be predetermined prior to orientation of the mouse and input to the computer. If the scanner (represented by mouse points $M_1$ and $M_2$) does cross over the first vertical line 302 of the grid pattern 13 at an angle, the distance from the first mouse ($M_1$) to the second mouse ($M_2$) can be utilized to form one side of a triangle (a), while the distance across the grid pattern travelled by the first mouse forms a second side of the triangle (b).

From this information, the angle 304 at which the scanner traversed the line 302 can be easily determined through trigonometric functions. The angle 304 in turn can be utilized to compensate for the angle at which the scanner is out of alignment with the vertical lines of the grid pattern in order to establish a vertical axis. Once again, the origin of the now established coordinate system can be established at either mouse point $M_1$ or $M_2$. In the unlikely event that both mice cross line 302 at exactly the same time, line 302 is established as the vertical axis and no orientation calculations are thereby required.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A method for establishing a coordinate system in a memory of a computer through communication with a scanner positioned over a grid pattern having indicia of position forming an orthogonal array of rows and columns of pixels with centers having coordinate positions, said computer having memory addresses corresponding to the coordinate positions of said pixels, said scanner having a detector array including detector elements 0 through N−1 for detecting pixel data from a page covered by said grid pattern and communicating said pixel data to the computer for storage in said memory, a first position sensor separated a first predetermined distance from detector element 0 for detecting said indicia and communicating first indicia detection information to said computer, and a second position sensor separated a second predetermined distance from said first position sensor for detecting said indicia and communicating second indicia detection information to said computer, comprising the steps of:
   placing said scanner on said grid pattern in a first position;
   commencing detection of said indicia by said position sensors;
   moving said scanner across the surface of said grid pattern in a predetermined manner to a second position and communicating said first and second information to said computer;
   determining the distance (DY) on said grid pattern between said position sensors for each position of said scanner between said first position and said second position on said grid pattern until each position of said scanner determined to have a maximum distance between said position sensors has been established;
   determining the average position of all positions of said scanner determined to have said maximum distance; and
   establishing the origin of said coordinate system as a memory address corresponding to the coordinate position of one of said position sensors when said scanner was positioned at said average position and establishing one axis of said coordinate system as a row or column of pixels closest to the coordinate position of said origin and the coordinate position of said other position sensor.

2. A method for establishing a coordinate system in a memory of a computer through communication with a scanner as recited in claim 1 wherein said predetermined manner of moving said scanner includes the step of rotating said scanner in a first direction relative to either a selected horizontal column or vertical row of said grid pattern.

3. A method for establishing a coordinate system in a memory of a computer through communication with a scanner as recited in claim 2 wherein said predetermined manner of moving said scanner further includes the step of rotating said scanner in said first direction to said second position by a predetermined degree of arc from said first position.

4. A method for establishing a coordinate system in a memory of a computer through communication with a scanner as recited in claim 3 wherein said predetermined manner of moving said scanner further includes the steps of:
   sensing whether said maximum distance has been determined; and
   rotating said scanner in a second direction to a third position in the direction of said first position by at least a 15 degree of arc from said second position if said maximum distance has not been determined.

5. A method for establishing a coordinate system in a memory of a computer through communication with a scanner as recited in claim 3 wherein said step of placing said scanner on said grid pattern includes the steps of:
   placing said scanner at a small angle to a selected vertical column of said grid pattern; and
   setting temporary coordinates for said first position sensor at (0,0) and setting temporary coordinates for said second position sensor at (0,0).

6. A method for establishing a coordinate system in a memory of a computer through communication with a scanner as recited in claim 5 wherein said step of determining DY includes the steps of:
   (a) assuming the first value determined for DY to be the maximum distance ($DY_L$) on said grid pattern between said position sensors;
   (b) comparing each new value calculated for DY ($DY_N$) to the value of $DY_L$ until the value of $DY_N$ is found to be larger than or equal to the value of $DY_L$, changing the value of $DY_L$ to the value of $DY_N$ each time a value of $DY_N$ is larger than or equal to a value of $DY_L$, and continuing to compare the value of $DY_N$ to $DY_L$ thereafter until a value of $DY_N$ is less than the value of $DY_L$;
   (c) storing the temporary coordinates of said first and second positions sensors and the value of $DY_L$ for the position of said scanner preceding the position of said scanner where $DY_N$ was found to be less than $DY_L$, which corresponds to a position of maximum DY, in said memory;
   (d) repeating steps (b) and (c) until a first position of maximum DY for said scanner in said first direction and a second position of maximum DY for said scanner in said first direction have been determined and marking the area in said memory corresponding to the area on said grid pattern between said first and second positions of maximum DY as an area of maximum DY.

7. A method for establishing a coordinate system in a memory of a computer through communication with a scanner as recited in claim 6 wherein said average position is the position of said scanner determined to be in the middle of said area of maximum DY.

8. A method for establishing a coordinate system in a memory of a computer through communication with a scanner as recited in claim 7 and further including the step of indicating when said area of maximum DY has been determined.

9. A method for establishing a coordinate system in a memory of a computer through communication with a scanner as recited in claim 6 and further including the step of indicating when said area of maximum DY has been determined.

10. A method for establishing a coordinate system in a memory of a computer through communication with a scanner as recited in claim 4 and further including the steps of:
   establishing a first position of said scanner determined to have said maximum distance in said second direction;
   establishing a second position of said scanner determined to have said maximum distance in said second direction; and
   establishing the area on said grid pattern between said first and second positions as an area of maximum distance.

11. A method for establishing a coordinate system in a memory of a computer through communication with a scanner as recited in claim 10 wherein said average position is the position of said scanner determined to be in the middle of said area of maximum distance.

12. A method for establishing a coordinate system in a memory of a computer through communication with a scanner as recited in claim 1 wherein said step of placing scanner on said grid pattern includes the steps of:
   placing said scanner at a small angle to a selected vertical column of said grid pattern; and
   setting temporary coordinates for said first position sensor at (0,0) and setting temporary coordinates for said second position sensor at (0,0).

13. A method for establishing a coordinate system in the memory of a computer through communication with a scanner as recited in claim 12 wherein said step of determining DY includes the steps of:

(a) assuming the first value determined for DY to be the maximum distance ($DY_L$) on said grid pattern between said position sensors;

(b) comparing each new value calculated for DY ($DY_N$) to the value of $DY_L$ until the value of $DY_N$ is found to be larger than or equal to the value of $DY_L$, changing the value of $DY_L$ to the value of $DY_N$ each time a value of $DY_N$ is larger than or equal to a value of $DY_L$, and continuing to compare the value of $DY_N$ to $DY_L$ thereafter until a value of $DY_N$ is less than the value of $DY_L$;

(c) storing the temporary coordinates of said first and second positions sensors and the value of $DY_L$ for the position of said scanner preceding the position of said scanner where $DY_N$ was found to be less than $DY_L$, which corresponds to a position of maximum DY, in said memory;

(d) repeating steps (b) and (c) until a first position of maximum DY for said scanner in said first direction and a second position of maximum DY for said scanner in said first direction have been determined and marking the area in said memory corresponding to the area on said grid pattern between said first and second positions of maximum DY as an area of maximum DY.

14. A method for establishing a coordinate system in a memory of a computer through communication with a scanner as recited in claim 13 wherein said average position is the position of said scanner determined to be in the middle of said area of maximum DY.

15. A method for establishing a coordinate system in a memory of a computer through communication with a scanner as recited in claim 14 and further including the step of indicating when said area of maximum DY has been determined.

16. A method for establishing a coordinate system in a memory of a computer through communication with a scanner as recited in claim 13 and further including the step of indicating when said area of maximum DY has been determined.

17. A method for establishing a coordinate system in the memory of a computer through communication with a scanner as recited in claim 1 wherein a position of said scanner is determined when either said first position sensor or said second position sensor detects the crossing of one of said rows or columns.

* * * * *